Aug. 30, 1966 K. STEEB 3,269,488
OIL SLUDGE COLLECTOR
Filed March 2, 1964

INVENTOR.
Karl Steeb 3,269,488
OIL SLUDGE COLLECTOR
Karl Steeb, 149 Harlem Ave., Buffalo, N.Y. 14224
Filed Mar. 2, 1964, Ser. No. 348,539
5 Claims. (Cl. 184—106)

This invention relates to improvements in means for cleaning carbon and other foreign material from the oil pan of a conventional internal combustion engine.

It is common practice for operators of internal combustion engines such as operators of motor vehicles to have the oil in the engine changed at regular intervals in order that the carbon and other fine particles which collect in the oil may be removed from the engine.

Previous attempts to overcome the necessity of changing the oil frequently have led to the use of various types of filters in the oil pumping system, whereby a substantial portion of the carbon and other fine particles are removed. While such particles are to the most part removed from the oil, a large percentage of fine particles collects on the bottom of the oil pan or oil pump to form a sludge deposit. It is conventional practice to clean this sludge by having the oil pan removed and rinsed periodically. It will be seen that since removing the oil pan constitutes a considerable amount of time and effort then normally the pan is not removed except only occasionally, whereby a considerable amount of sludge collects on the bottom of the pan and remains there between oil changes, thereby the new oil added being contaminated with particles from this sludge.

Accordingly, it is an object of the present invention to provide a carbon and other sludge collector which may be installed on the bottom of an oil pan and which will collect a considerable portion of any sludge tending to form on the bottom of the pan.

It is a further object of this invention to provide an oil sludge collector which provides means for cleaning the sludge from the device at periodic intervals and at the same time, does not involve any replacement of parts or units thereof.

These and other objects and features of the invention will become apparent from the following detailed description and accompanying drawings in which like numerals refer to like parts:

Figure 1:
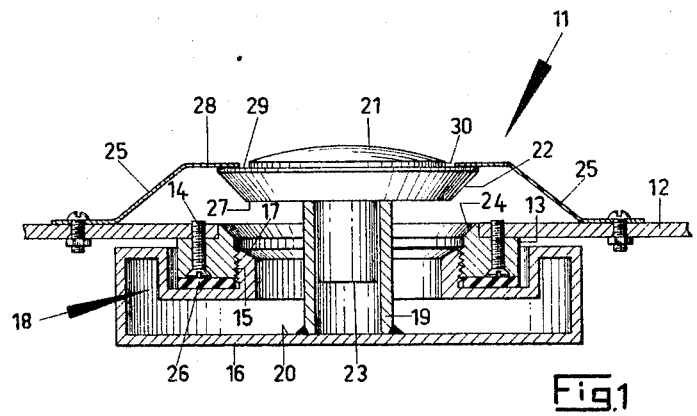
FIG. 1 is a section through a presently preferred embodiment of the invention and shows the device as installed upon an automobile oil pan.
Figure 2:
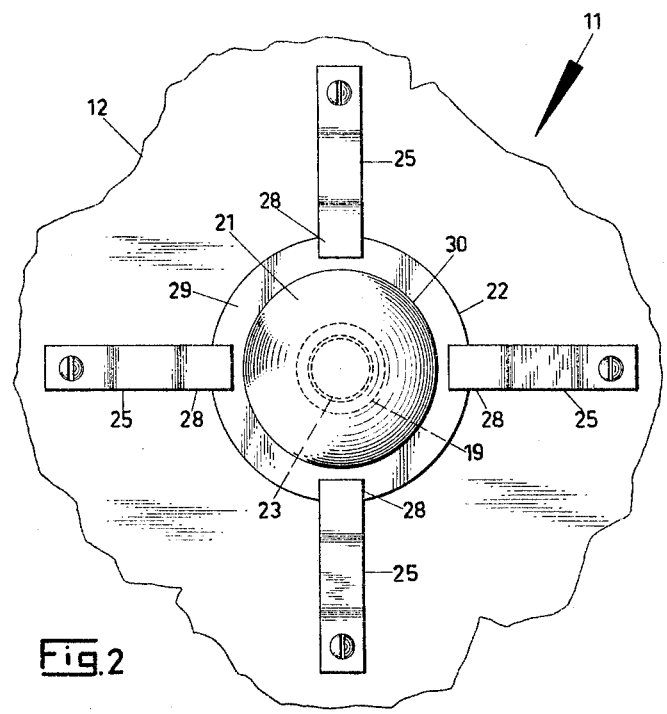
FIG. 2 is a plan view of the device.

Having reference to FIG. 1 and FIG. 2, a sludge collector indicated generally as 11 is illustrated, the device being secured to an oil pan 12 of an automobile. Collector 11 comprises a threaded ring 13 which is permanently secured to the oil pan 12 in this instance by means of screws 14. Ring 13 is provided with a thread 15 internally thereof and is adapted to receive a collector body 16, body 16 having a threaded collar 17 adapted to threadably engage ring 13.

Body 16 is substantially circular in configuration and is provided with a chamber 18 of annular configuration whereby the volume of a body 16 is increased. A short pipe 19 is secured to the bottom of 20 of body 16 by means of welding or other suitable means of attachment. Body 16 protrudes, in the installed position, upwardly into the oil pan 12 through the opening as defined by ring 13. A plug 21 provided with a sealing face 23 is loosely inserted into pipe 19 whereby plug 21 is located substantially centrally of the opening as defined by the ring 13. A seating face 24 is provided internally and on the upper edge of ring 13 whereby upon body 16 being unthreaded from ring 13 pipe 19 being attached thereto is moved downwardly whereby plug 21 is lowered until the seating face 22 meets with the seating face 24 and seals the oil pan 12. A number of springs 25 are secured by convential means, such as, for instance, bolts to the oil pan 12 are adapted to bear on plug 21 and bias same downwardly onto pipe 19 in the installed position and onto seating face 24 upon the body 16 being removed from ring 13.

In use the device 11 may be installed onto an existing oil pan 12 by first cutting a hole in a lower portion of the oil pan 12, such as, for instance, adjacent to the drain plug whereafter the ring 13 may be installed by suitable means such as, for instance, the screws 14. The spring 25 may then be installed and may be any in number to provide adequate biasing of the plug 21.

In the event that the pan 12 is removed for the installation of the device the plug 21 may be installed at any time. However, if it is desired to install the device onto the oil pan which is installed on the automobile engine then it is necessary to place plug 21 within the oil pan first since the diameter of the plug 21 is greater than the diameter of the ring opening and for this reason must be placed within the oil pan before the installation of ring 13.

Upon the ring and plug 21 being in position within the oil pan 12, the body 16 may then be located on ring 13 and threaded thereon until tightly engaged in an oil proof seal.

It is intended that either one of two methods of sealing the threads 15 against oil leak may be resorted to. In the first case the thread 15 may be of the taper type such as normally are provided on oil pan plugs which upon being tightened, form an oil proof seal. However, other means may be resorted to such as, for instance, by providing a washer 26 between the ring 13 and the body 16 whereby a suitable seal will be obtained.

As the body 16 is screwed inwardly onto the ring 13, pipe 19 bearing upon the under surface 27 of plug 21 will force plug 21 upwardly against the springs 25. It will be seen that as the body 16 is rotated there will be a tendency for the plug 21 to also rotate due to frictional contact with pipe 19, however, the ends 28 of springs 25 riding on the flat surface 29 of plug 21 and also guided by the ridge 30 on plug 21 will guide the plug 21 into a substantially central position at all times.

The device 11 may be left onto the pan for a considerable length of time and may be occasionally removed for inspection to note how much sludge may be collecting into the chamber as defined by the body 16. The body 16 may be removed at any time and cleaned by washing in any suitable solvent, the plug 21 during this time effectively sealing off the hole as defined by ring 13.

It will be further understood that resort may be had to alterations in design and form of the device without departing from the spirit of the invention, and while still falling within the scope of the subjoined claims.

The embodiments of this invention in which an exclusive property or privilege is claimed are defined as follows:

1. An oil sludge collector adapted to be secured to the bottom of an oil pan of an internal combustion engine thereby to remove carbon and other sludge from the lubricating oil therein, and comprising a ring defining a threaded bore therethrough and secured about a hole in said pan thereby to define an egress for said oil sludge; a collector body including an annular collar secured thereto, said collar being threadably secured within said ring; a pipe secured concentrically within said body and projecting upwardly therefrom to a position above said oil pan bottom; a valve disc removably secured onto the top of said pipe, said valve disc thereby being supported above said ring; a valve seat formed about the upper periphery of said bore, thereby to provide sealing means for said valve disc; spring means secured to said pan bottom and positioned to bear on said valve disc to bias same onto said pipe; and a seating face formed about the lower periphery of said valve disc, whereby upon said body being unthreaded from said ring, said disc, biased downwardly by said spring means, will seat on said valve seat on said ring to seal said oil egress.

2. An oil sludge collector adapted to be secured to the bottom of an oil pan of an internal combustion engine, thereby to remove carbon and other sludge from the lubricating oil, therein, and comprising a ring defining a threaded bore therethrough and secured about a hole in said pan thereby to define an egress for said oil sludge; a collector body including an annular collar secured thereto, said collar being threadably secured within said ring; a pipe secured concentrically within said body and projecting upwardly therefrom to a position above said oil pan bottom; a valve disc removably secured onto the top of said pipe, said valve disc thereby being supported above said ring; a valve seat formed about the upper periphery of said bore, thereby to provide sealing means for said valve disc; spring means secured to said pan bottom and positioned to bear on said valve disc to bias same onto said pipe; a ridge formed on top of said valve disc, whereby said spring means bearing on said ridge will maintain said disc substantially concentric with said ring; and a seating face formed about the lower periphery of said valve disc, whereby upon said body being unthreaded from said ring, said disc, biased downwardly by said spring means, will seat on said valve seat on said ring to seal said oil egress.

3. An oil sludge collector adapted to be secured to the bottom of an oil pan of an internal combustion engine, thereby to remove carbon and other sludge from the lubricating oil therein, and comprising a ring defining a threaded bore therethrough and secured about a hole in said pan thereby to define an egress for said oil sludge; a collector body including an annular collar secured thereto, said collar being threadably secured within said ring; a pipe secured concentrically within said body and projecting upwardly therefrom to a position above said oil pan bottom; a valve disc removably secured onto the top of said pipe, said valve disc thereby being supported above said ring; a valve seat formed about the upper periphery of said bore, thereby to provide sealing means for said valve disc; a stud secured to the bottom of said valve disc and projecting into said pipe, thereby to guide and position said disc onto said pipe; spring means secured to said pan bottom and positioned to bear on said valve disc to bias same onto said pipe; and a seating face formed about the lower periphery of said valve disc, whereby upon said body being unthreaded from said ring, said disc, biased downwardly by said spring means, will seat on said valve seat on said ring to seal oil egress.

4. An oil sludge collector adapted to be secured to the bottom of an oil pan of an internal combustion engine, thereby to remove carbon and other sludge from the lubricating oil therein, and comprising a ring defining a threaded bore therethrough and secured about a hole in said pan thereby to define an egress for said oil sludge; a collector body including an annular collar secured thereto, said collar being threadably secured within said ring; a seal between said ring and said body, whereby oil is prevented from leaking therefrom upon said body being threadably secured to said ring; a pipe secured concentrically within said body and projecting upwardly therefrom to a position above said oil pan bottom; a valve disc removably secured onto the top of said pipe, said valve disc thereby being supported above said ring; a valve seat formed about the upper periphery of said bore, thereby to provide sealing means for said valve disc; spring means secured to said pan bottom and positioned to bear on said valve disc to bias same onto said pipe; and a seating face formed about the lower periphery of said valve disc, whereby upon said body being unthreaded from said ring, said disc, biased downwardly by said spring means, will seat on said valve seat on said ring to seal oil egress.

5. An oil sludge collector adapted to be secured to the bottom of an oil pan of an internal combustion engine, thereby to remove carbon and other sludge from the lubricating oil therein, and comprising; a ring defining a threaded bore therethrough and secured about a hole in said pan thereby to define an egress for said oil sludge; a collector body including an annular collar secured thereto, said collar being threadably secured within said ring; a seal between said ring and said body, whereby oil is prevented from leaking therefrom upon said body being threadably secured to said ring; a pipe secured concentrically within said body and projecting upwardly therefrom to a position above said oil pan bottom; a valve disc removably secured onto the top of said pipe said valve disc thereby being supported above said ring; a valve seat formed about the upper periphery of said bore, thereby to provide sealing means for said valve disc; a stud secured to the bottom of said valve disc and projecting into said pipe, thereby to guide and position said disc onto said pipe; spring means secured to said pan bottom and positioned to bear on said valve disc to bias same onto said pipe; a ridge formed on top of said valve disc, whereby said spring means bearing on said ridge will maintain said disc substantially concentric with said ring; and a seating face formed about the lower periphery of said valve disc, whereby upon said body being unthreaded from said ring, said disc, biased downwardly by said spring means, will seat on said valve seat on said ring to seal said oil egress.

References Cited by the Examiner
UNITED STATES PATENTS

| | | | |
|---|---|---|---|
| 1,365,644 | 1/1921 | Applin | 184—106 X |
| 1,446,056 | 2/1923 | Misener | 184—106 |
| 2,632,565 | 3/1953 | Penner | 210—234 |

REUBEN FRIEDMAN, *Primary Examiner.*

C. DITLOW, *Assistant Examiner.*